(12) United States Patent
Willey

(10) Patent No.: US 6,307,846 B1
(45) Date of Patent: Oct. 23, 2001

(54) METHOD AND SYSTEM IN WIRELESS COMMUNICATION SYSTEM FOR SCHEDULING MESSAGES TO REDUCE THE QUICK PAGING CHANNEL PEAK POWER LEVEL

(75) Inventor: William Daniel Willey, San Mateo, CA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/512,140

(22) Filed: Feb. 24, 2000

(51) Int. Cl.[7] ............................... H04J 3/02; H04Q 7/00
(52) U.S. Cl. ........................................ 370/329; 370/461
(58) Field of Search ................................. 370/311, 318, 370/326, 328, 329, 336, 337, 345, 347, 348, 349, 442, 443, 444, 445, 447, 458, 461, 462; 340/825.44, 876.13, 870.11; 455/434, 458, 466, 515

(56) References Cited

U.S. PATENT DOCUMENTS

| | | | |
|---|---|---|---|
| 5,625,629 | * 4/1997 | Wenk | 370/347 |
| 5,726,640 | * 3/1998 | Jones et al. | 340/825.22 |
| 5,748,104 | * 5/1998 | Argyroudis et al. | 340/870.11 |
| 5,909,651 | * 6/1999 | Chander et al. | 455/466 |
| 6,138,034 | * 10/2000 | Willey | 455/522 |
| 6,157,815 | * 12/2000 | Collins et al. | 455/38.1 |

* cited by examiner

Primary Examiner—Kwang B. Yao
(74) Attorney, Agent, or Firm—Sayed H. Beladi; Lalita P. Williams

(57) ABSTRACT

The method operates in a wireless communication system (100) that includes a paging channel (202) and a plurality of quick paging channels (204). A plurality of paging channel time slots (206) are defined within the paging channel, and a plurality of quick paging channel time slots (208) are defined within the quick paging channels. The method includes determining paging indicators (210) in a quick paging channel time slot; determining if there is a time collision (304) between paging indicators that would be set on different quick paging channels; selecting a message associated with one of the paging indicators involved in the time collision; and canceling the selected message, or rescheduling the selected message such that the message is sent in a subsequent paging channel time slot.

33 Claims, 12 Drawing Sheets

METHOD AND SYSTEM IN WIRELESS COMMUNICATION SYSTEM FOR SCHEDULING MESSAGES TO REDUCE THE QUICK PAGING CHANNEL PEAK POWER LEVEL

FIELD OF THE INVENTION

This invention relates generally to wireless communication systems, and, more particularly, to a method and system in a wireless communication system for scheduling messages on a paging channel to reduce the quick paging channel peak power level.

BACKGROUND OF THE INVENTION

In a typical wireless communication system such as a cellular radio frequency (RF) radiotelephone system, a base station communicates with a mobile communication unit, or mobile station, operating within an area served by the base station system.

Multiple access wireless communication between the base station and the mobile station occurs via RF channels that provide paths over which communication signals such as voice, data, and video are transmitted. Base-to-mobile station communications are said to occur on a forward- or down-link channel, while mobile-to-base station communications are referred to as being on a reverse- or up-link channel.

Code division multiple access (CDMA) is one example of a well-known digital RF channelization technique. A communications system using CDMA channelization is described in detail in TIA/EIA Standard IS-2000-1 Introduction to cmda2000 Standards for Spread Spectrum Systems [IS-2000-1]; TIA/EIA Standard IS-2000-2 Physical Layer Standard for cdma2000 Spread Spectrum Systems [IS-2000-2]; TIA/EIA Standard IS-2000-3 Medium Access Control (MAC) Standard for cdma2000 Spread Spectrum Systems [IS-2000-3]; TIA/EIA Standard IS-2000-4 Signaling Link Access Control (LAC) Standard for cdma2000 Spread Spectrum Systems [IS-2000-4]; and TIA/EIA Standard IS-2000-5 Upper Layer (Layer 3) Signaling Standard for cdma2000 Spread Spectrum Systems [IS-2000-5], Telecommunications Industry Association, Washington, D.C. IS-2000-1, IS-2000-2, IS-2000-3, IS-2000-4, and IS-2000-5 [collectively, the IS-2000 Standard] are incorporated herein by reference.

Typically, all users of a CDMA system transmit and receive communications signals over a common frequency spectrum, and specialized codes, such as Walsh codes, are used for separating multiple communication signals from one another in the system. Each specialized code typically represents one communication channel within the common frequency spectrum. A communication channel may be, among other things, a paging channel or a traffic channel.

The IS-2000 standard provides for paging channels divided into time slots, or paging channel time slots. One or more paging channels may be used by the base station. Within those paging channels, a plurality of paging channel time slots are assigned to the mobile station. A base station transmits pages and other messages to a mobile station in the paging channel time slots assigned to that mobile station.

The IS-2000 standard further provides for quick paging channels. Quick paging channels, like paging channels, are divided into time slots, or quick paging channel time slots. When a mobile station is to receive a message on a paging channel, the base station enables one or more paging indicators on the quick paging channel to alert the mobile station that it should monitor its assigned paging channel. This alleviates the requirement that a mobile station monitor every assigned time slot of the paging channel for messages. Instead, the mobile station may enter a sleep mode, waking only to monitor its assigned paging indicators on the quick paging channel. If an assigned paging indicator is enabled, the mobile station wakes up to receive a message on the paging channel. Otherwise, the mobile station may return to the sleep mode until the time of its next scheduled paging indicator. Because the paging indicators are relatively short, the mobile station conserves energy by remaining in the sleep mode for longer periods of time. Consequently, the mobile station's battery life is increased.

To increase the probability that a mobile station will determine correctly the status of a paging indicator, paging indicators, when enabled, are typically transmitted at a high power level. When a base station is required to transmit multiple paging indicators simultaneously, the peak power level of the quick paging channels can be significant. In order to allow for higher peak power levels on the quick paging channels, the base station may be forced to reduce the amount of power amplifier capacity reserved for traffic channels, thereby reducing the base station capacity. Accordingly, it may be desirable to limit the number of paging indicators simultaneously transmitted by a base station.

There is therefore a need for an improved mechanism of scheduling messages to be transmitted over a wireless communications system that reduces the quick paging channel peak power level by limiting the number of paging indicators that are transmitted simultaneously.

DETAILED DESCRIPTION OF THE PREFERRED EMBODIMENTS

Figure 1:
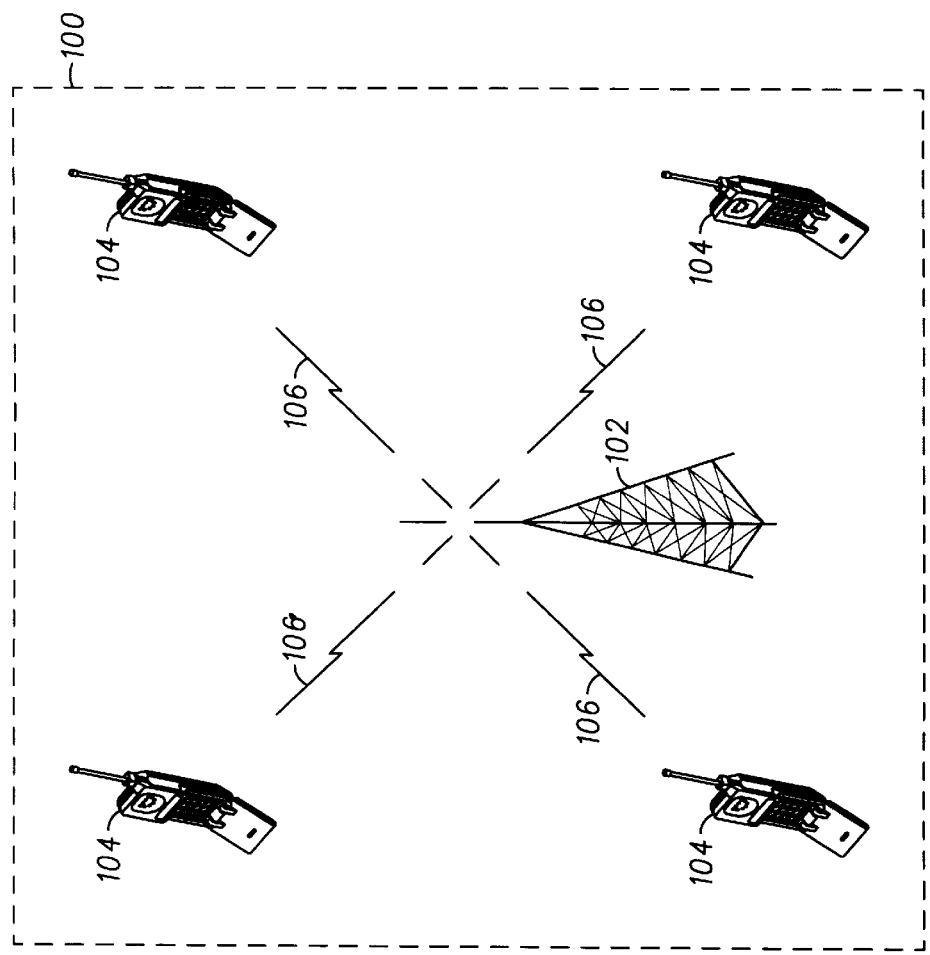
FIG. 1 is a block diagram of a wireless communication system suitable for use with the embodiments of the present invention.

Turning now to the drawings, wherein like numerals designate like components, FIG. 1 is a block diagram of a wireless communication system 100. A communication system using digital channelization which is suitable for use with the various embodiments of the present invention is described in detail in the IS-2000 Standard. As shown in FIG. 1, a base station 102 communicates with a plurality of mobile stations 104 via wireless communication signals 106. The communication signals are transmitted on channels, with different channels being used for different types of communications. One type of channel is a paging channel ("paging channel"), a forward communication channel used by the base station 102 to send pages or other messages to a mobile station 104. Another type of channel is a quick paging channel ("QPCH"), a forward communication channel used by the base station 102 to alert a mobile station 104 that it should monitor a paging channel to receive a page or other message.

There is a distinction between pages and messages in the IS-2000 standard. According to IS-2000, there may be more than one page included in a single general page message. The present invention is equally applicable to both pages and other messages. For purposes of this discussion, pages and other messages will be referred to collectively as "messages."

Figure 2:
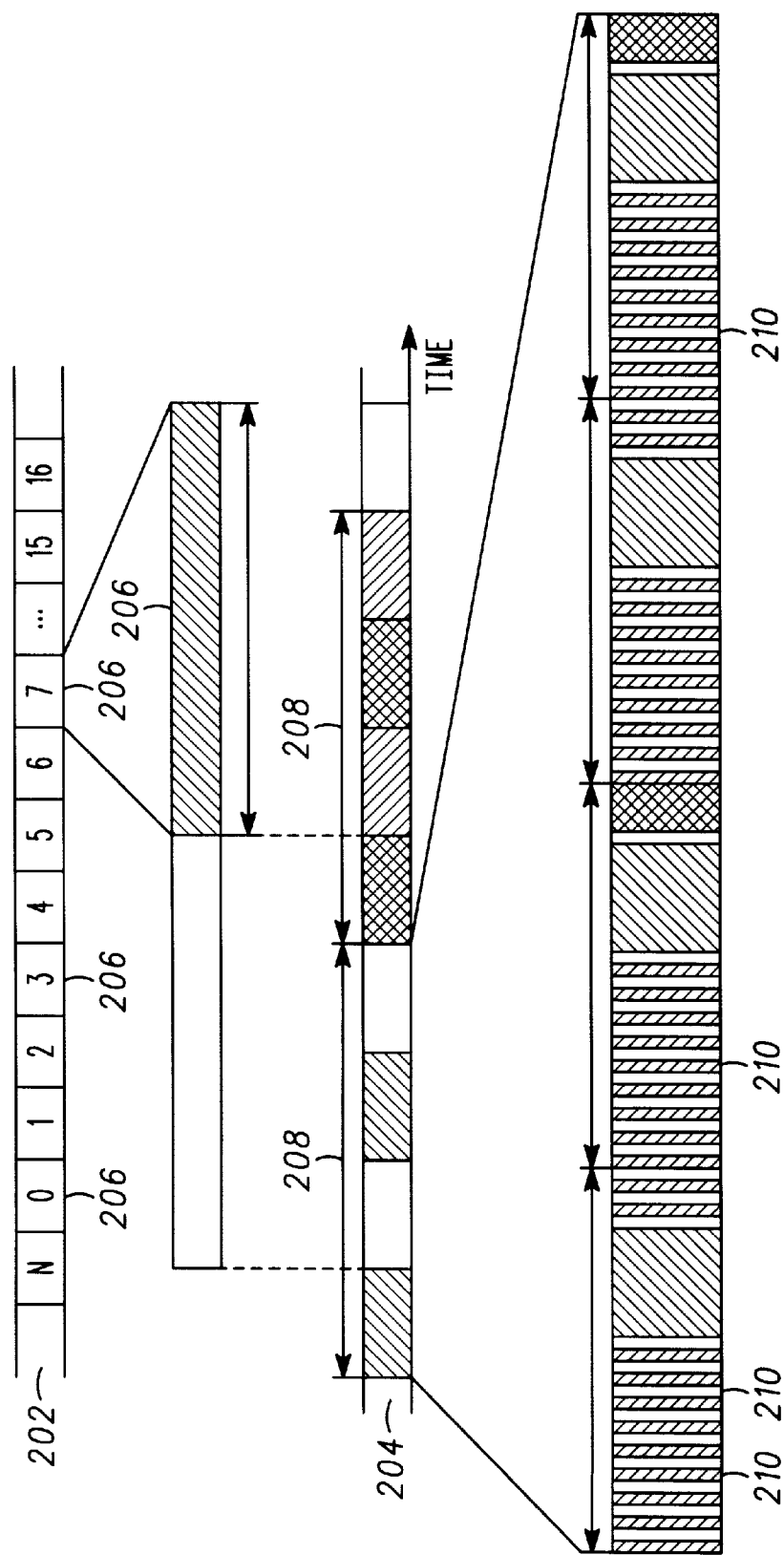
FIG. 2 is a timing diagram of paging channel slots and quick paging channel time slots, as contained in a paging channel and a quick paging channel, respectively.

FIG. 2 is a timing diagram of a paging channel 202 and a quick paging channel 204. The paging channel 202 is divided into paging channel time slots ("PCH time slots") 206. The base station 102 transmits a message to a mobile station 104 in one or more PCH time slots 206.

Similarly, the quick paging channel is divided into quick paging channel time slots ("QPCH time slots") 208. Within each QPCH time slot 208 is a plurality of paging indicators 210. A paging indicator 210 is a binary digit, or bit, that the base station 102 may enable to alert a mobile station 104 that it should monitor a paging channel 202 for a message. When a mobile station is not monitoring a paging channel 202, the mobile station enters a sleep mode, waking periodically to monitor a paging indicator 210. The base station 102 uses on-off keying to transmit the paging indicators 210. For example, for one value (on) the base station 102 transmits a signal at a given power level during the paging indicator 210 time period and for the other value (off) the bases station does not transmit any power during the paging indicator 210 time period.

To ensure statistically uniform use of resources in the communication system 100, a hash function is used to assign paging channels 202, quick paging channels 204, PCH time slots 206, and QPCH time slots 208 to be used for communication between the base station 102 and a particular mobile station 104. One or more hash functions are also used to assign paging indicators 210 to a mobile station 104. For example, the IS-2000 Standard describes suitable hash functions that are based on a system time signal and a mobile station's 104 International Mobile Subscriber/Station Identity (IMSI). Consistent with the hash functions, a mobile station 104 is said to hash to its assigned paging indicator 210.

When a base station 102 determines that a message is to be transmitted to a mobile station 104 in a PCH time slot 206, the base station 102 enables a paging indicator 210 assigned to the mobile station 104 in the QPCH time slot 208 immediately preceding the scheduled PCH time slot 206. The mobile station 104 may be assigned multiple paging indicators 210 in a QPCH time slot 208, as in the IS-2000 Standard. In this case, the base station will enable all of the assigned paging indicators 210 in the QPCH time slot 208 immediately preceding the scheduled PCH time slot 206. The assignment to a mobile station 104 of multiple paging indicators 210 increases the probability that the mobile station 104 can avoid waking up for an upcoming PCH time slot 206. If the mobile station 104 fails to determine that it can avoid waking up for the next assigned PCH time slot 206 based on the first paging indicator 210, the mobile station 104 monitors a later paging indicator 210 to determine whether the mobile station 104 should wake up to receive a message on the paging channel 202.

The probability of a mobile station 104 waking up after receiving a paging indicator is a function of the number of mobile stations 104 being paged and the number of available paging indicators 210. During periods of high paging load, a mobile station 104 that is not being paged is more likely to incorrectly wake up because it hashes to the same paging indicator 210 as another mobile station 104 that is being paged. This is referred to as a "collision." Collisions can decrease the battery life of a mobile station 104 because they cause the mobile station 104 to wake up unnecessarily. The problem of collisions can be alleviated at least partially by using more than one quick paging channel 204.

When multiple quick paging channels 204 are configured, however, multiple messages in the same PCH time slot 206 can cause paging indicators 210 on different quick paging channels 204 to be enabled at the same time. When a "time collision" such as this occurs, an excessive amount of base station 102 transmit power could be required for the quick paging channels 204.

Figure 3:
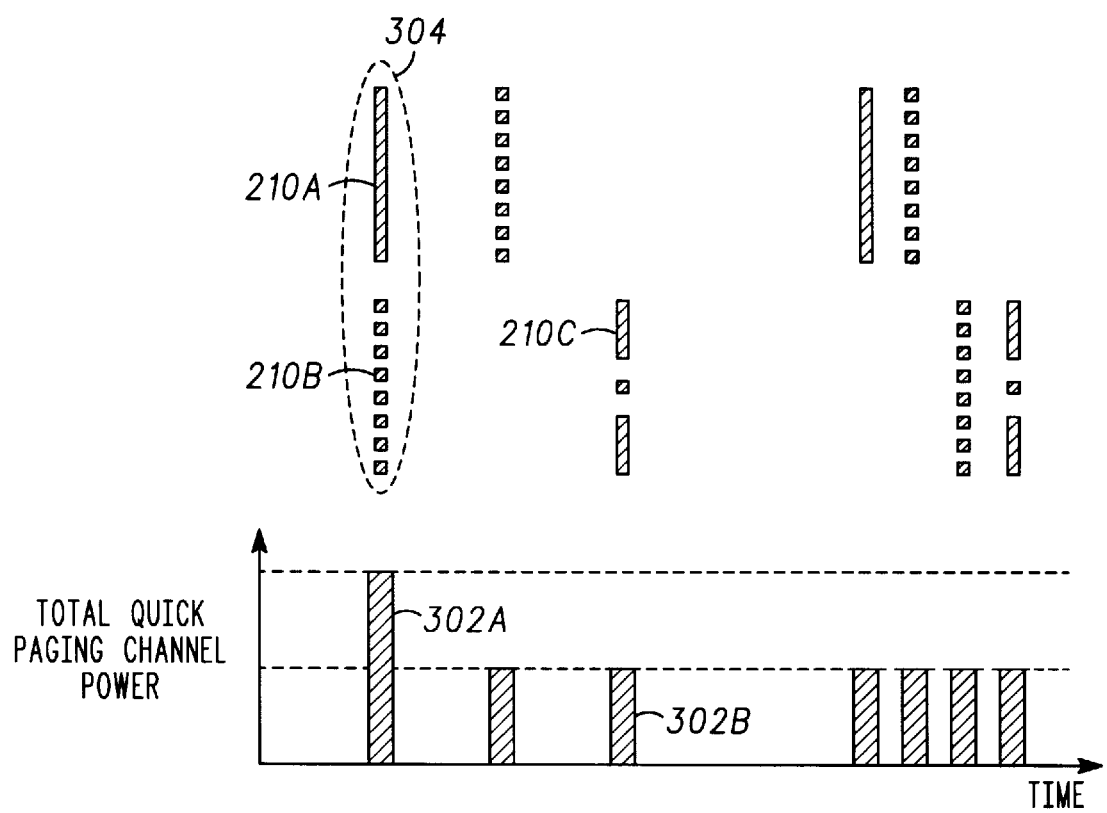
FIG. 3 is a graph of the total quick paging channel power transmitted by a base station when different combinations of paging indicators are enabled on two quick paging channels.

FIG. 3 is a graph of the total quick paging channel power ("QPCH power") 302 transmitted by the base station 102 when different combinations of paging indicators 210 are enabled on two quick paging channels 204. A time collision 304 is shown where two paging indicators 210A, B are enabled simultaneously on different quick paging channels 204. The total QPCH power 302A during this time collision 304 is twice the total QPCH power 302B required for transmission of a single paging indicator 210C. To prevent transmitting this excessive amount of total QPCH power 302A, time collisions 304 may be avoided. This is accomplished by limiting the number of paging indicators 210 that may be transmitted simultaneously on different quick paging channels. One way to achieve this limitation is to reschedule one or more of the messages that correspond to the paging indicators 210A, B involved in a time collision 304.

Figure 4:
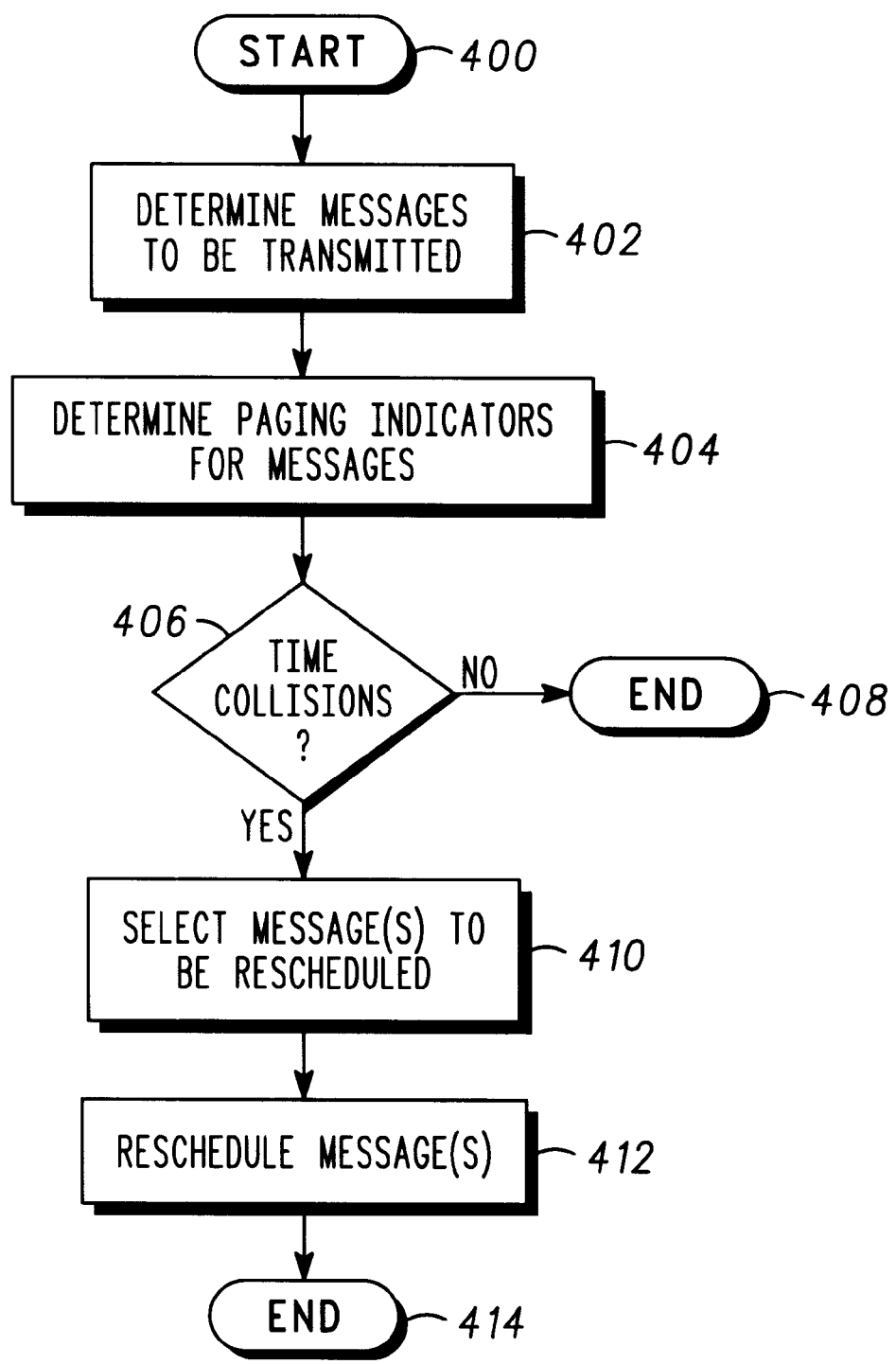
FIG. 4 is a flowchart depicting one presently preferred method for scheduling messages on a paging channel to reduce the quick paging channel peak power level.

FIG. 4 is a flowchart depicting one presently preferred method for scheduling messages on a paging channel to reduce the QPCH peak power level. At step 402, the base station 102 determines messages to be transmitted to mobile stations 104 on a paging channel 202. As described above, the messages will be transmitted in PCH time slots 206. The next step 404 is to determine paging indicators 210 to be enabled to alert the mobile stations 104 of upcoming messages on the paging channel 202. In step 406, the base station determines whether there is a time collision 304 between any of the paging indicators 210 to be enabled. If there is no time collision 304, the process ends 408. However, if there is a time collision 304, the next step 410 is to select a message involved in the time collision 304 for rescheduling. The final step 412 is to reschedule the selected message. The base station 102 thus prevents the time collision 304 and limits the QPCH peak power level.

In the event of a time collision 304, there are various ways to accomplish the step of selecting a message to be rescheduled 410. For instance, a message could be selected based upon the amount of time the message has been queued for transmission. Preferably, the message that has been queued for the shortest time would be rescheduled.

A message may also be selected for rescheduling based upon the amount of time until the next scheduled PCH time slot 206 assigned to that message. Preferably, the message with the earliest subsequent PCH time slot 206 would be rescheduled.

Another alternative is to select a message to be rescheduled based upon the number of time collisions 304 in which each message is involved. Preferably, the message involved in the most time collisions 304 would be rescheduled.

Yet another approach is to select a message for rescheduling based upon whether multiple mobile stations 104 scheduled to receive messages hash to the same paging indicator 210 on the same quick paging channel 204. In this case, the base station 102 is able to alert multiple mobile stations 104 of scheduled messages by enabling only one paging indicator 210 on a single quick paging channel 204. If another message requires transmission of only a single paging indicator 210 on a different quick paging channel 204 at the same time, preferably that message would be rescheduled. In this way, only a single message is delayed instead of two messages. As a result, the average message delay is reduced.

Depending on the power requirements of the base station 102, it may not be necessary to prevent all time collisions 304. It may be desirable, however, to limit the number of paging indicators 210 that can be involved in a time collision 304. This is demonstrated in FIG. 5.

Figure 5:
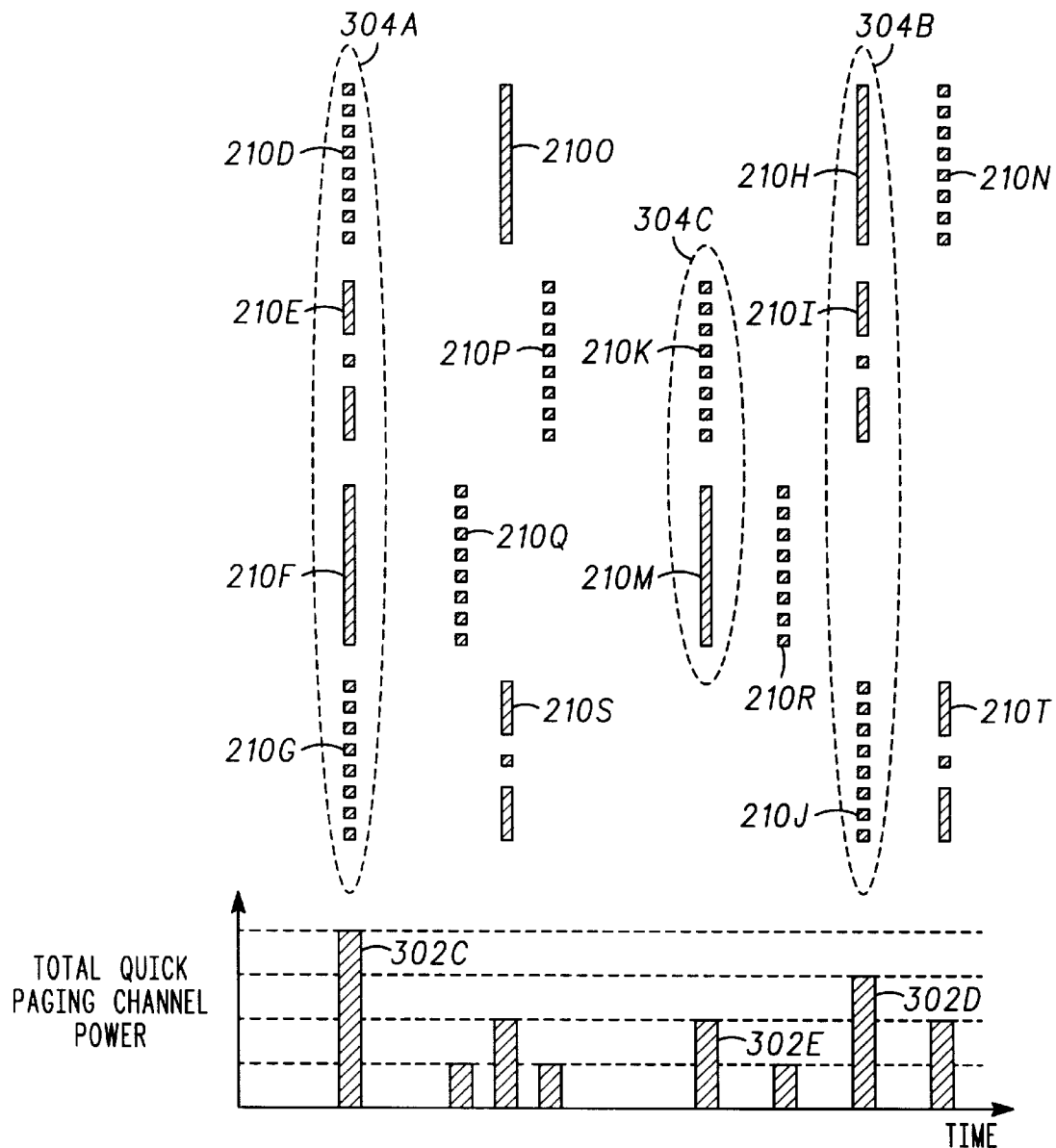
FIG. 5 is a graph of the total power transmitted by a base station when different combinations of paging indicators are enabled on four quick paging channels.

FIG. 5 is a graph of the total QPCH power 302C-E transmitted by a base station 102 when different combinations of paging indicators 210 are enabled on four quick paging channels 204. The total QPCH power 302C for a time collision 304A between four paging indicators 210D–G is higher than the total QPCH power 302D for a time collision 304B between only three paging indicators 210H–J. Likewise, the total QPCH power 302D for a time collision 304B between three paging indicators 210H–J is higher than the total QPCH power 302E for a time collision 304C between only two paging indicators 210K, M.

If the number of paging indicators 210 allowed to be involved in a time collision is limited, the QPCH peak power level can be reduced. For instance, the base station 102 could set an upper limit of three paging indicators per time collision 304. Accordingly, even without preventing time collisions 304 entirely, the total QPCH power 302 may be limited by setting an upper limit on the number of paging indicators 210 that may be involved in a time collision 304. Only messages corresponding to paging indicators 210 beyond this upper limit would need to be rescheduled.

In another preferred embodiment of the present invention, it may not be necessary to reschedule messages to limit the QPCH peak power level. Instead, some messages may be canceled. This approach is effective in systems incorporating a repeat-paging scheme, as demonstrated in FIG. 6.

Figure 6:
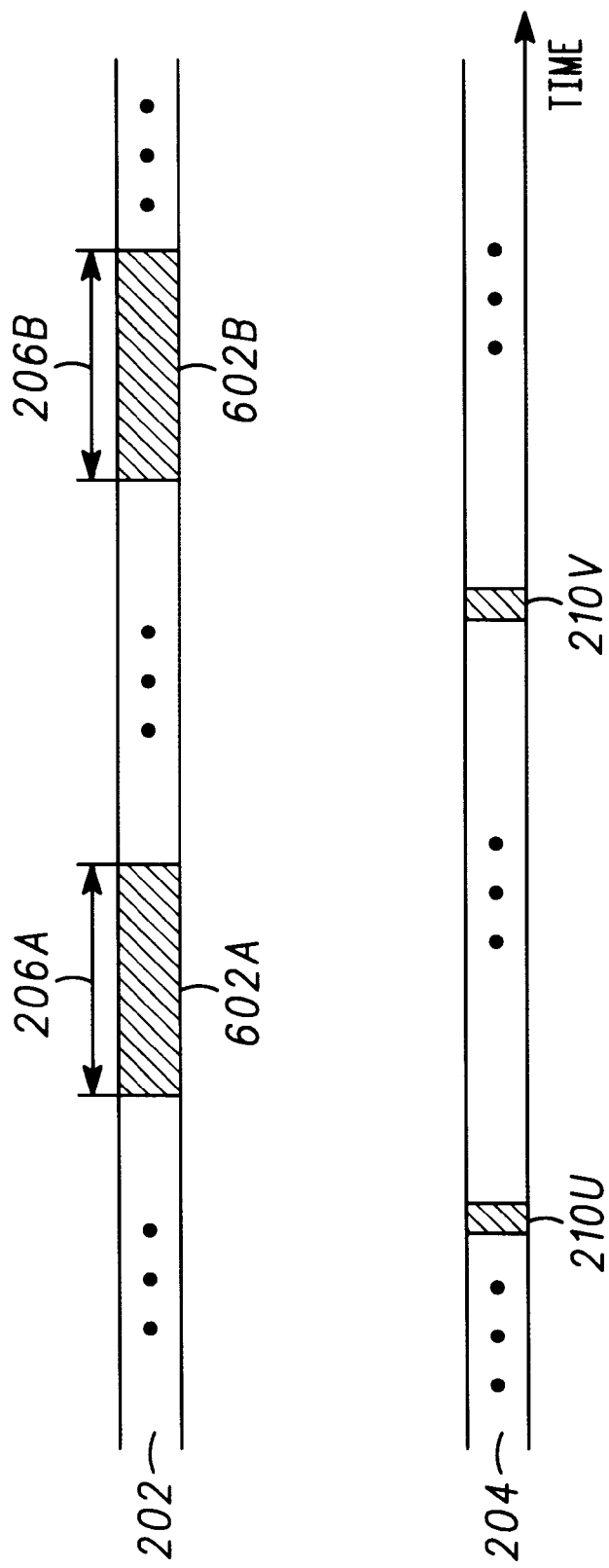
FIG. 6 is a timing diagram of a paging channel and a quick paging channel in a repeat-paging scheme.

FIG. 6 is a timing diagram of a paging channel 202 and a quick paging channel 204 in a repeat-paging scheme. A first transmission 602A of a message is sent in a first PCH time slot 206A on a paging channel 202. A first paging indicator 210U associated with the first PCH time slot 206A is enabled to alert the mobile station 104 of the pending first transmission 602A. A second transmission 602B of the same message is scheduled in a subsequent second PCH time slot 206B. A second paging indicator 210V is associated with the second PCH time slot 206B. This repetitive transmission of a message increases the reliability of the communication system 100 by increasing the probability that a mobile station 104 will properly receive a message intended for it. If, however, one of the paging indicators 210U, V is involved in a time collision 304, the transmission 602A, B in the corresponding PCH time slot 206A, B may be cancelled to avoid the time collision 304 on the quick paging channel 204.

For instance, if the second paging indicator 210V is involved in a time collision 304, the second transmission 602B of the message may be cancelled, rather than rescheduled. Cancellation of the second transmission 602B is acceptable because the message is still sent in the first transmission 602A. Thus, in a repeat-paging scheme, the transmission redundancy may be sacrificed for a given message to prevent a time collision 304 involving one of the associated paging indicators 210U, V. Accordingly, so long as at least one transmission 602A, B of each message is sent, the QPCH power 302 may be limited by canceling one or more transmissions 602A, B of a message rather than rescheduling the transmissions 602A, B.

Whether or not at least one transmission 602A, B of a message will be sent depends on the probability that all transmissions 602A, B of a message will be involved in time collisions 304. If this probability is low, it may be assumed that at least one transmission 602A, B of every message will always be sent. In this case, cancellation of a transmission 602A, B is acceptable. However, if that probability is high, it might be necessary to check each message involved in a time collision 304 to confirm that at least one transmission 602A, B of that message will be sent. If at least one transmission 602A, B of the message is scheduled to be sent, the transmission 602A, B involved in the time collision 304 may be canceled. If not, the transmission 602A, B involved in the time collision 304 should be rescheduled. This is demonstrated in FIGS. 7 and 8.

Figure 7:
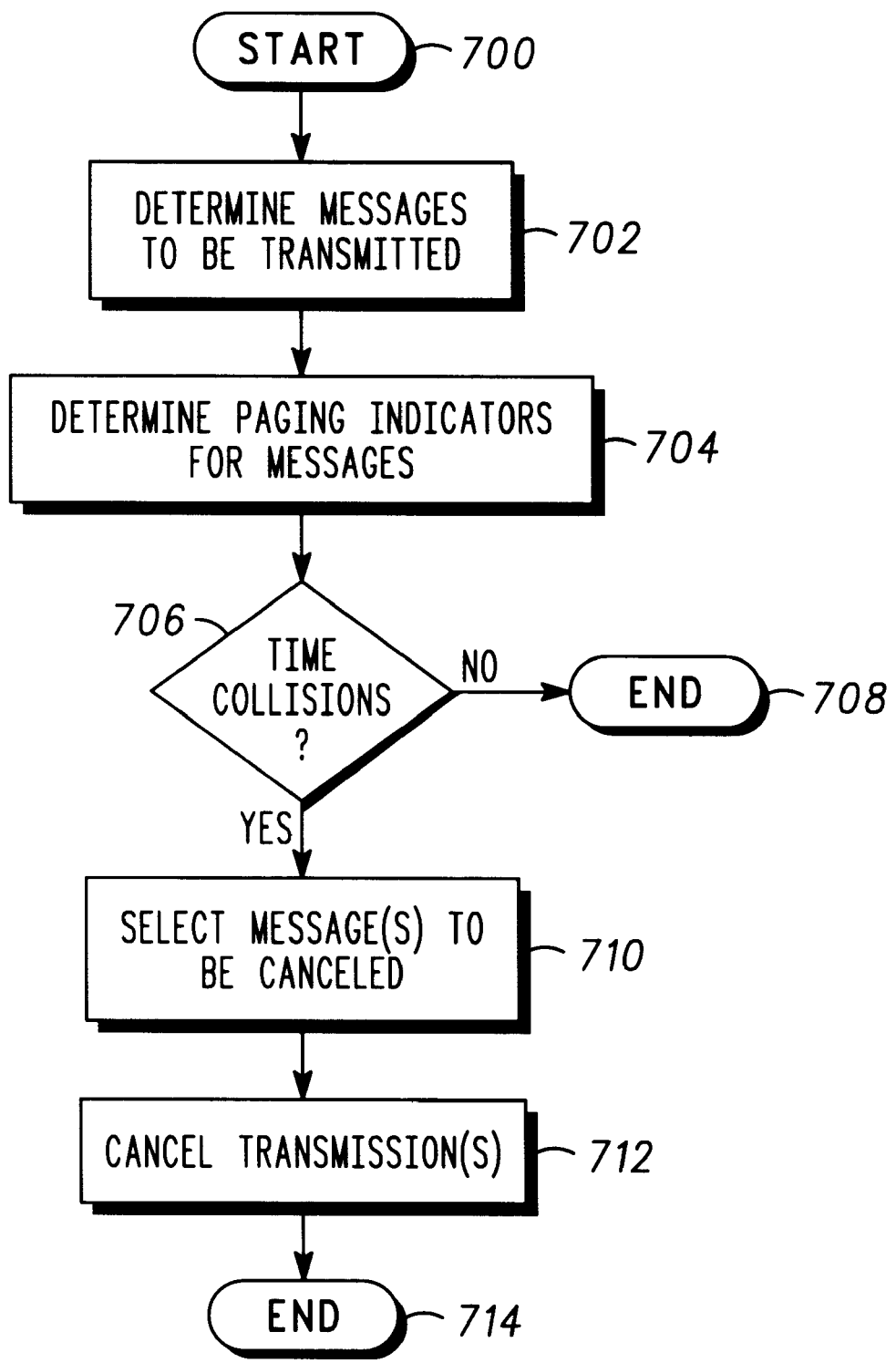
FIG. 7 is a flowchart depicting another presently preferred method for scheduling messages on a paging channel to reduce the quick paging channel peak power level.

FIG. 7 is a flowchart depicting another presently preferred method for scheduling messages on a paging channel to reduce the QPCH peak power level. This method is preferable in systems using a repeat-paging scheme with a low probability that all transmissions 602A, B of a message will be involved in time collisions 304. At step 702, the base station 102 determines messages to be transmitted to mobile stations 104 on a paging channel 202. As described above, the messages will be transmitted in PCH time slots 206. The next step 704 is to determine paging indicators 210 to be enabled to alert the mobile stations 104 of upcoming messages on the paging channel 202. In step 706, the base station determines whether there is a time collision 304 between any of the paging indicators 210 to be enabled. If there is no time collision 304, the process ends 708. However, if there is a time collision, the next step 710 is to select a message transmission 602a, b involved in the time collision 304 for cancellation. The final step 712 is to cancel the message transmission 602A, B involved in the time collision 304. The base station 102 thus prevents the time collision 304 and limits the QPCH peak power level.

Figure 8:
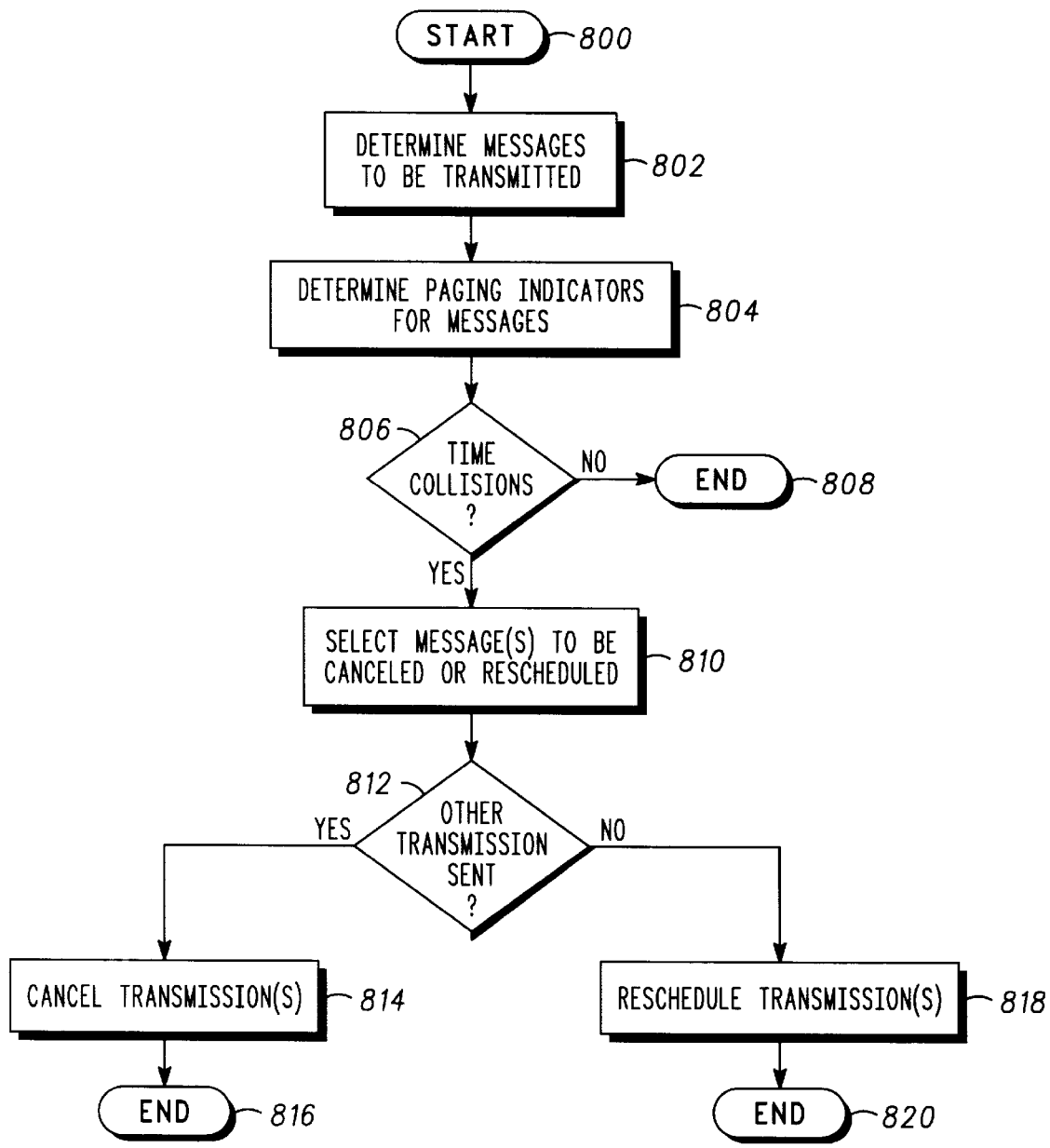
FIG. 8 is a flowchart depicting yet another presently preferred method for scheduling messages on a paging channel to reduce the quick paging channel peak power level.

FIG. 8 is a flowchart depicting yet another presently preferred method for scheduling messages on a paging channel to reduce the QPCH peak power level. This method is preferable in systems using a repeat-paging scheme with a relatively high probability that all transmissions 602A, B of a message will be involved in time collisions 304. At step 802, the base station 102 determines messages to be transmitted to mobile stations 104 on a paging channel 202. As described above, the messages will be transmitted in PCH time slots 206. The next step 804 is to determine paging indicators 210 to be enabled to alert the mobile stations 104 of upcoming messages on the paging channel 202. In step 806, the base station determines whether there is a time collision 304 between any of the paging indicators 210 to be enabled. If there is no time collision 304, the process ends 808. However, if there is a time collision, the next step 810 is to select a message transmission 602A, B involved in the time collision 304 for cancellation or rescheduling. Once one or more message transmissions 602A, B have been selected, the next step 812 is to determine whether at least one other transmission 602A, B of each selected message will be sent. If so, the selected message transmission 602a, b is cancelled in step 814. If not, the selected message transmission 602A, B is rescheduled in step 818. The base station 102 thus prevents the time collision 304 and limits the QPCH peak power level.

As described above, there are various methods to accomplish the step of selecting a message for cancellation or rescheduling 810. In addition to the methods set forth above, the message may also be selected based upon whether or not at least one other transmission 602A, B of the message will be sent. Preferably, a message with at least one other transmission 602A, B scheduled to be sent would be selected over a message with no other transmissions 602A, B scheduled to be sent. If such a selection is made, the selected message transmission 602A may be canceled at step 814, rather than rescheduled at step 818.

Figure 9A:
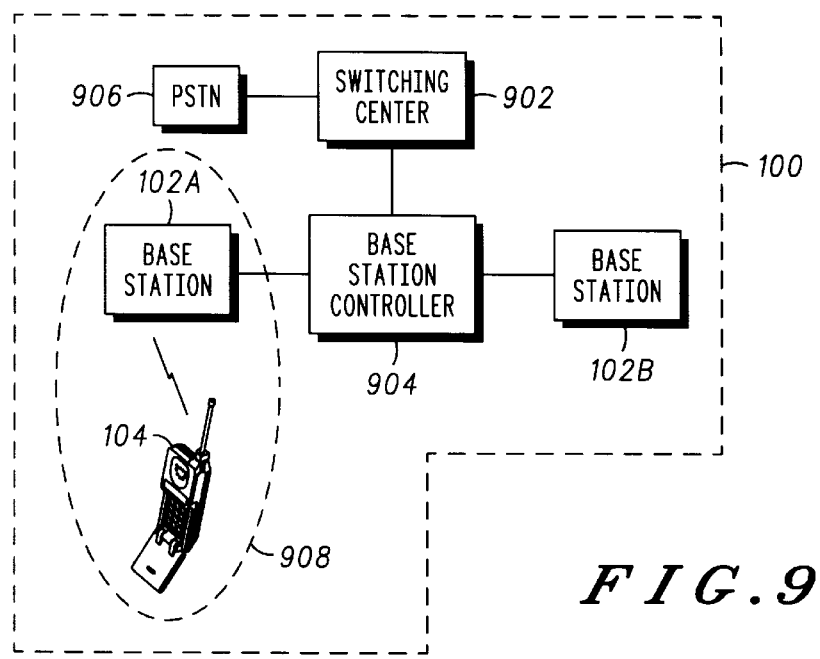
FIGS. 9A and 9B are block diagrams of a wireless communication system suitable for use with presently preferred embodiments of the present invention.

FIG. 9A is a block diagram of a wireless communication system 900. A communication system using digital channelization which is suitable for use with the various embodiments of the present invention is described in detail in IS-2000. The communications system 900 includes a switching center 902, which may be a mobile switching center such as an EMX.TM.5000, commercially available from Motorola, Inc., or another suitable type of switching center. The switching center 902 is in communication with, among other things, base station controller 904, and public switched telephone network (PSTN) 906.

Base station controller 904 may include at least one processor (not shown) and one or more memories (not shown), and is commercially available from Motorola, Inc. Base station controller 904 is in turn in communication it with two base stations 102A and 102B, each of which may include a plurality of transceivers (not shown), along with one or more processors (not shown) and one or more memories (not shown), which are also available from Motorola, Inc. Additional base station controllers may be coupled to switching center 902. Likewise, additional base stations may be coupled to base station controller 904. It is further contemplated herein that base stations 102A and 102B may be sectors of a sectorized base station (not shown).

Mobile station 104 is shown operating in area 908 served by base station 102A.

Figure 9B:
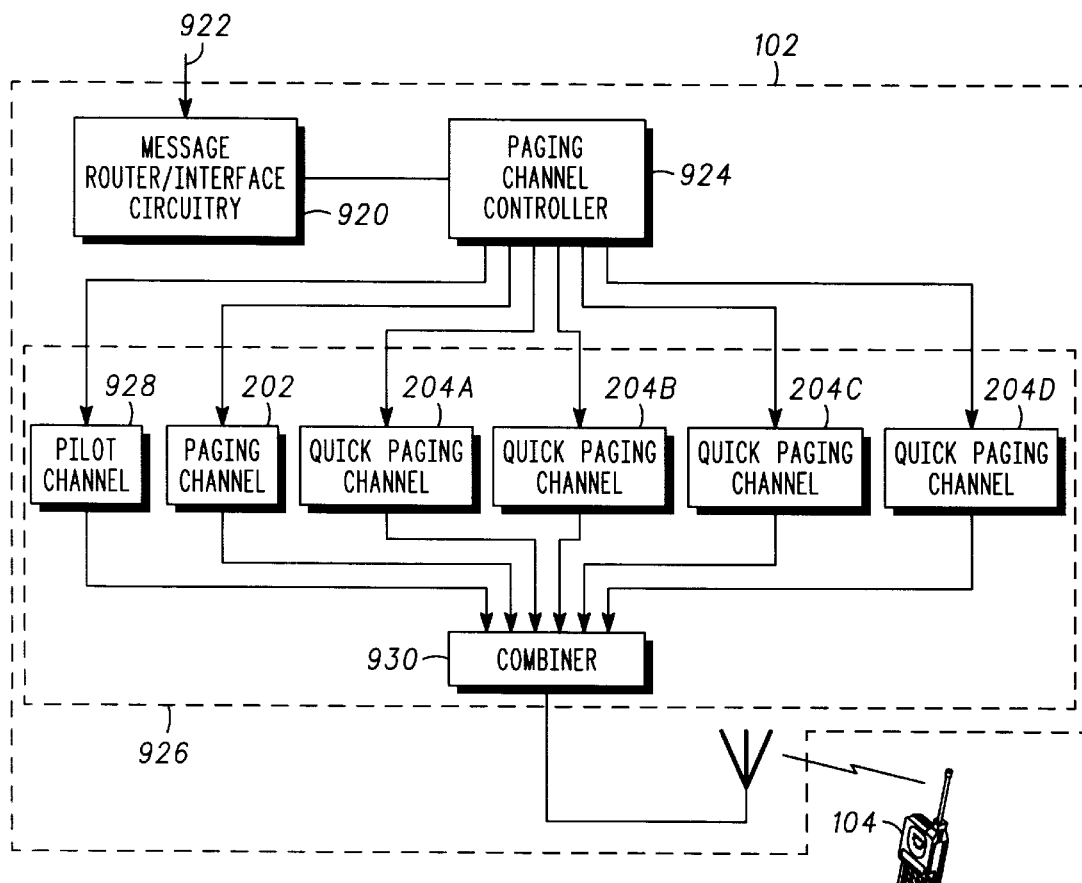

FIG. 9B is a block diagram of a portion of the wireless communication system shown in FIG. 9A. Message router/ interface circuit 920 is preferably included within base station 102 and is responsible for distributing pages and other messages received over communication link 922 to be broadcast to mobile communication units such as mobile communication unit 104. For purposes of discussion, it is assumed that message router/interface circuit 920 is responsive to base station controller 904.

Message router/interface circuit 920 is in communication with paging channel controller ("PCH controller") 924. PCH controller 924 is preferably included within, or in communication with, base station 102. PCH controller 924 may include one or more queues (not shown) which hold messages received from message router/interface circuit 920.

Although PCH controller 924 is described as being included in, or in communication with, base stations 102, it will be appreciated that PCH controller 924 may be positioned at any suitable location within communication system 900, for example, within, or in communication with, base station controller 904. The functions of PCH controller 924 may be implemented in hardware and/or software. A general purpose computer, for example, may be programmed according to well-known methods to control the formatting and delivery of pages and other messages by PCH controller 924.

PCH controller 924 is responsive to transmit block 926, which includes pilot channel 928, paging channel 202 and quick paging channels 204A–D. As is well-known, channels 928, 202, and 204A–D may be associated with Walsh codes or other unique spreading codes. Transmit block 926 is preferably associated with base station 102 or another base station responsive to base station controller 904.

Transmit block 926 is responsible for interleaving, encoding, spreading, combining, modulating and transmitting information over channels in a CDMA system such as a system based on IS-2000. For example, pilot channel 928 generates a pilot signal according to well-known methods, paging channel 202 generates paging signals according to well-known methods and quick paging channels 204A–D generate quick paging signals according to well-known methods. Combiner 930, which is responsive to the channels, is responsible for combining, modulating and transmitting forward-link communication signals from base station 102. Transmit block 926 may be implemented as one or more base station transceivers.

Figure 10:
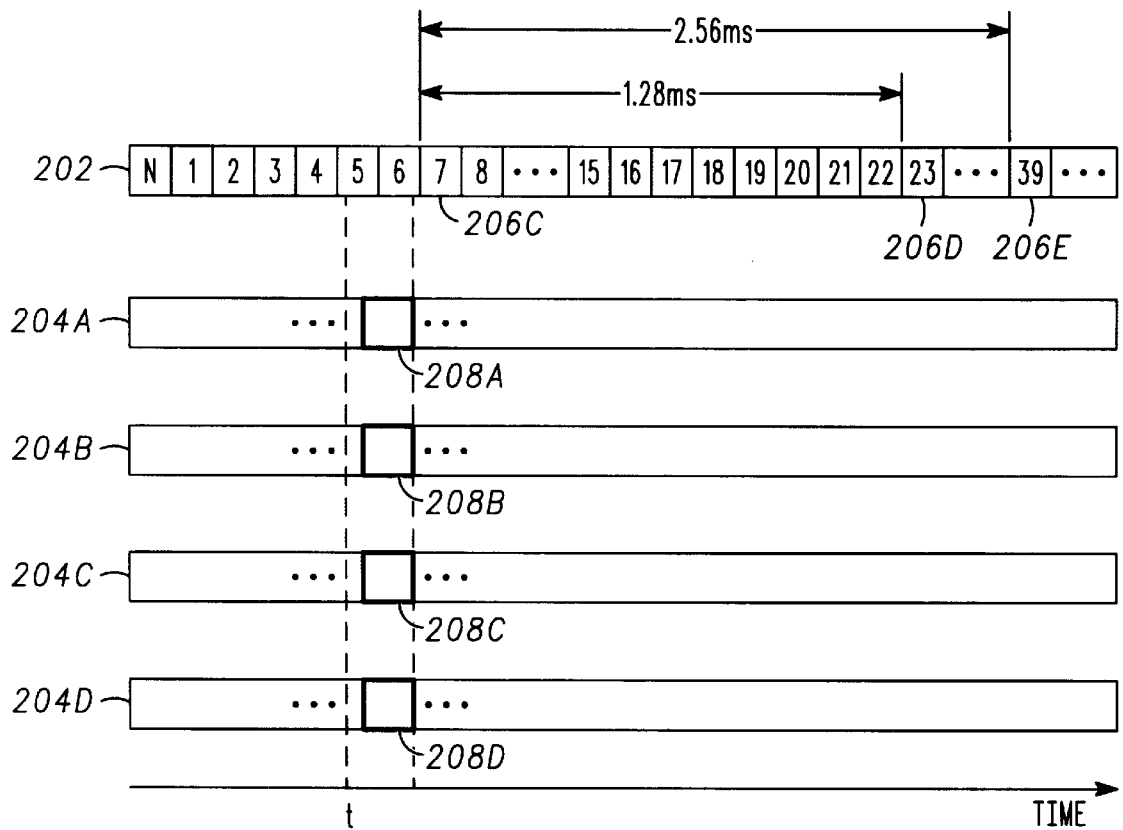
FIG. 10 is a timing diagram of a paging channel including paging channel slots, and a quick paging channel including quick paging channel time slots.

FIG. 10 is a timing diagram of a paging channel 202 and its associated PCH time slots 206, and four quick paging channels 204 and their associated QPCH time slots 208. PCH time slot 206C is assigned to a number of mobile stations. The mobile stations assigned to paging slot 206C are determined according to a hash function as described in IS-2000. PCH time slot 206D occurs 1.28 seconds after PCH time slot 206C, so mobile stations assigned to slot 206C and using a slot cycle of zero (described in IS-2000) are also assigned to slot 206D. PCH time slot 206E occurs 2.56 seconds after PCH time slot 206C, so mobile stations assigned to slot 206C and using a slot cycle of one (described in IS-2000) are also assigned to PCH time slot 206E (but not assigned to PCH time slot 206D). Quick paging channels 204A–D are associated with the paging channel 202. QPCH time slots 208A–D are associated with PCH time slot 206C and begin 100 ms earlier than the beginning of PCH time slot 206C.

Figure 11:
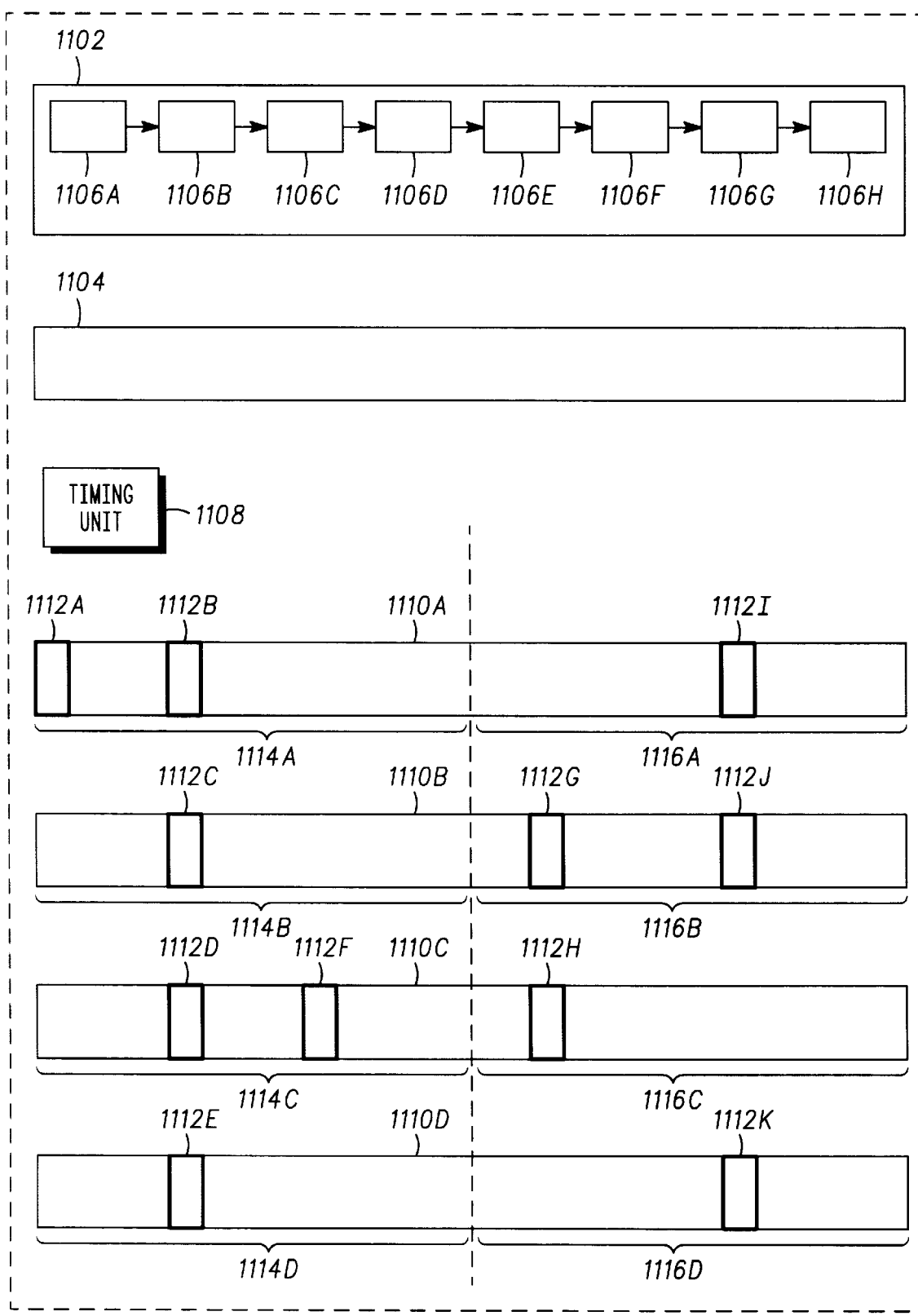
FIG. 11 is a diagram of a paging channel controller suitable for use with presently preferred embodiments of the present invention.

FIG. 11 shows PCH controller 924 in more detail. PCH controller 924 includes a page queue 1102 and a temporary page queue 1104. For purposes of discussion, page queue 1102 holds a number of messages 1106A–H queued to be transmitted for PCH time slot 206C. Each message 1106 is represented by a data structure (not shown). The message data structure contains the following: the IMSI of the mobile station being paged, the preferred slot cycle index of the mobile station being paged (see IS-2000), and the time the message was initially placed in the page queue upon reception from message router/interface circuit 920. For purposes of discussion, the maximum slot cycle index is set to one which means that mobile stations with preferred slot cycle index of zero will use slot cycle of zero and will wake up for their assigned paging indicators every 1.28 seconds and mobile stations with preferred slot cycle index of one will use slot cycle of one and will wake up for their assigned paging indicators every 2.56 seconds. It should be noted that in the PCH controller 924 there are also other queues for other PCH time slots 206. The messages 1106 are received via base station controller 904 and message router/interface circuit 920. Temporary page queue 1104 stores temporarily queued messages 1106 being considered for transmitting in a PCH time slot 206. Timing unit 1108 measures time. The time a message 1106 is initially placed in the page queue 1102 is determined from the timing unit 1108.

The PCH controller 924 also contains one quick paging channel bit buffer ("QPCH bit buffer") 1110A–D for each quick paging channel 204A–D. Each QPCH bit buffer 1110A–D has one bit for each paging indicator in a QPCH time slot 208 on the associated quick paging channel 204A–D (some of the bits in the bit buffers are shown by 1112A–L). QPCH bit buffers 1110A–D are associated with quick paging channels 204A–D, respectively. A bit 1112 in the bit buffer 1110 will be set to one to indicate that a paging indicator 210 will be transmitted on the quick paging channel 204. Associated with each bit 1112 in the bit buffer 1110 is one or more pointers (not shown) which may point to a message 1106 in the temporary page queue 1104 which would cause the paging indicator 210 associated with the bit 1112 in the bit buffer 1110 to be set. Each QPCH bit buffer 1110 has bits 1112 associated with the paging indicators 210 in the first 40 ms of the QPCH time slot. The first 40-ms portions of bit buffers 1110A–D are shown by 1114A–D. Accordingly, the bits 1112A–F in the first portions 1114A–D of bit buffers 1110A–D correspond to first paging indicators 210 for mobiles in the assigned QPCH time slot. Similarly, each QPCH bit buffer has bits 1112 associated with the paging indicators 210 in the second 40 ms of the QPCH time slot. The second 40-ms portions of bit buffers 1110A–D are shown by 1116A–D. Accordingly, the bits 1112G–K in the second portions 1116A–D of bit buffers 1110A–D correspond to second paging indicators 210 for mobiles in the assigned QPCH time slot.

For purposes of discussion, page queue 1102 holds messages 1106A–H immediately prior to time t in FIG. 10. At time t, which is slightly before (PCH controller 924 must ensure that there is sufficient time to send data for the QPCH time slot to quick paging channels 204A–D) the beginning of QPCH time slots 208A–D, PCH controller 924 will determine which paging indicators 210 to set in QPCH time slots 208A–D and also the messages 1106 to send in PCH time slot 206C as follows.

First, PCH controller 924 will remove messages 1106A–H from the page queue 1102 and place them in the temporary page queue 1104 (which had been empty). For each message 1106 in the temporary page queue 1104, the PCH controller 924 will determine which quick paging channel 204 to use and which paging indicators 210 on that quick paging channel 204 would be set; both are determined by hashing (described in IS-2000) with the IMSI stored in the message data structure. For purposes of discussion, messages 1106A and B hash to the first quick paging channel 204A, represented by bit buffer 1110A. Messages 1106C and D hash to the second quick paging channel 204B, represented by bit buffer 1110B. Messages 1106E and F hash to the third quick paging channel 204C, represented by bit buffer 1110C. Messages 1106G and H hash to the fourth quick paging channel 204D, represented by bit buffer 1110D.

For purposes of discussion, messages 1106 map to paging indicators 210 as described below and will be mapped to quick paging channel bit buffers 1110 as described below. Message 1106A's first paging indicator is 2100 and is mapped to bit 1112b in the first portion 1114A of bit buffer 110A. Message 1106A's second paging indicator is 210N and is mapped to a bit in the second portion 1116A of bit buffer 1110A. Message 1106B's first paging indicator is 210P and is mapped to a bit in the first portion 1114A of bit buffer 1110A. Message 1106B's second paging indicator is 210H and is mapped to bit 1112I in the second portion 1116A of bit buffer 1110A. Message 1106C's first paging indicator is 210E and is mapped to bit 1112C in the first portion 1114B of bit buffer 1110B. Message 1106C's second paging indicator is 2101 and is mapped to bit 1112J in the second portion 1116B of bit buffer 1110B. Message 1106D's first paging indicator is 210P and is mapped to a bit in the first portion 1114B of bit buffer 1110B. Message 1106D's second paging indicator is 210K and is mapped to bit 1112G in the second portion 1116B of bit buffer 1110B. Message 1106E's first paging indicator is 210F and is mapped to bit 1112D in the first portion 1114C of bit buffer 1110C. Message 1106E's second paging indicator is 210M and is mapped to bit 1112H in the second portion 1116C of bit buffer 1110C. Message 1106F's first paging indicator is 210Q and is mapped to a bit in the first portion 1114C of bit buffer 1110C. Message 1106F's second paging indicator is 210R and is mapped to a bit in the second portion 1116C of bit buffer 1110C. Message 1106G's first paging indicator is 210G and is mapped to bit 1112E in the first portion 1114D of bit buffer 1110D. Message 1106G's second paging indicator is 210J and is mapped to bit 1112K in the second portion 1116D of bit buffer 1110D. Message 1106H's first paging indicator is 210S and is mapped to a bit in the first portion 1114D of bit buffer 1110D. Message 1106H's second paging indicator is 210T and is mapped to a bit in the second portion 1116D of bit buffer 1110D.

Initially each bit in QPCH bit buffers 1110A–D shall be set to zero. Then when the PCH controller determines which quick paging channel to use and which paging indicators on that quick paging channel would be set, for each message it sets the associated bits to one in the bit buffers 1110A–D. When a bit in a bit buffer is set, a pointer associated with the bit in the bit buffer is set to point to the associated message. For example, the pointer associated with bit 1112K will be set to point to message 1106G and the pointer associated with bit 1112E is also set to point to message 1106G.

After the appropriate bits in the bit buffer have been set, the PCH controller 924 will determine if there are any time collisions exceeding the upper limit. For purposes of discussion, it will be assumed that the upper limit of quick paging channels allowed to be involved in a single collision is three. For each bit in bit buffer 1110A, there is a corresponding bit in bit buffer 1110B, a corresponding bit in bit buffer 1110C, and a corresponding bit in bit buffer 1110D, all of which correspond to the same time. For purposes of discussion, assume that bitsl 112B–E all correspond to 19th bit position from the beginning of the QPCH time slot 206 of the corresponding quick paging channel 204A–D— all at the same time. Similarly, bits 1112G and 1112H are both at the same time. Also, bits 1112I, 1112J, and 1112K are all at the same time. PCH controller 924, for each bit in bit buffer 1110A, counts the total number of quick paging channels at the same time involved in a time collision. For example, the number of quick paging channels involved in a time collision for the bit 1112B time will be four because bits 1112B–E all are set. Similarly, the number of quick paging channels involved in a time collision for the bit 1112G time will be two because bits 1112G and H are both set. Also the number of quick paging channels involved in a time collision for the bit 1112I time will be three because bits 1112I–K all are set. For each bit position where more than three quick paging channels are involved in a time collision, PCH controller 924 selects one or more messages to be rescheduled or cancelled such that there are no more than three quick paging channels involved in a time collision (because three is the upper limit). Because messages 1106A,C,E, and G each correspond to one bit 1112B–E in the bit buffer 1110A–D for one quick paging channel 204A–D involved in a time collision, one of these messages must be rescheduled or cancelled. The pointers associated with bits 1112B–E are used to identify the messages 1106 involved in the collision (messages 1106A, C, E, and G, respectively) and associated data such as amount of time queued and preferred slot cycle index for each message 1106A, C, E, & G.

For example, suppose the time a message has been queued is the criteria being used for rescheduling messages. For purposes of discussion, PCH controller 924 compares the initial queue times for messages 1106A, C, E, and G with the current time from timing unit 1108 and determines that they have been queued for 100 ms, 200 ms, 300 ms, and 400 ms, respectively. In this case PCH controller 924 selects message 1106A to be rescheduled because message 1106A has been queued for the least amount of time (100 ms).

For a second example, suppose the amount of time until the next PCH time slot is the criteria being used for rescheduling messages. For purposes of discussion, suppose that the preferred slot cycle index for messages 1106A, C, and E are all two and the preferred slot cycle index for message 1106G is one. The next scheduled PCH time slot for messages 1106A, C, and E would be PCH time slot 206E (2.56 seconds later) and the next scheduled PCH time slot for message 1106G would be PCH time slot 206D (1.28 seconds later). In this case PCH controller 924 selects message 1106G to be rescheduled because the time of its next scheduled PCH time slot is sooner than the next scheduled slot for any of the other messages 1106A, C, and E.

To reschedule a message, PCH controller 924 removes the message from the temporary page queue 1104 and puts it in the appropriate page queue for the message's next scheduled PCH time slot. To cancel a message, PCH controller 924 simply removes it from the temporary page queue 1104. When a message is rescheduled or cancelled, the PCH controller also clears the associated bits in the QPCH bit buffer so that the value is zero. For example, if message 1106C is to be rescheduled, bits 1112C and 1112J will both be set to zero.

After removing messages from the temporary page queue 1104 and clearing bits as needed in the bit buffers, PCH controller 924 formats the messages still remaining in the temporary page queue 1104 according to well known methods to form data for a PCH time slot. PCH controller 924 then forwards the data to paging channel 202 which passes the data to combiner 930 to be transmitted during PCH time slot. PCH controller 924 also sends the data from quick paging channel bit buffers 1110A–D to quick paging channels 204A–D, respectively, which pass the data to combiner 930 to be transmitted during QPCH time slots.

PCH controller 924 then de-queues all messages from the temporary page queue 1104 so that it is empty for the next PCH time slot.

Figure 12A:
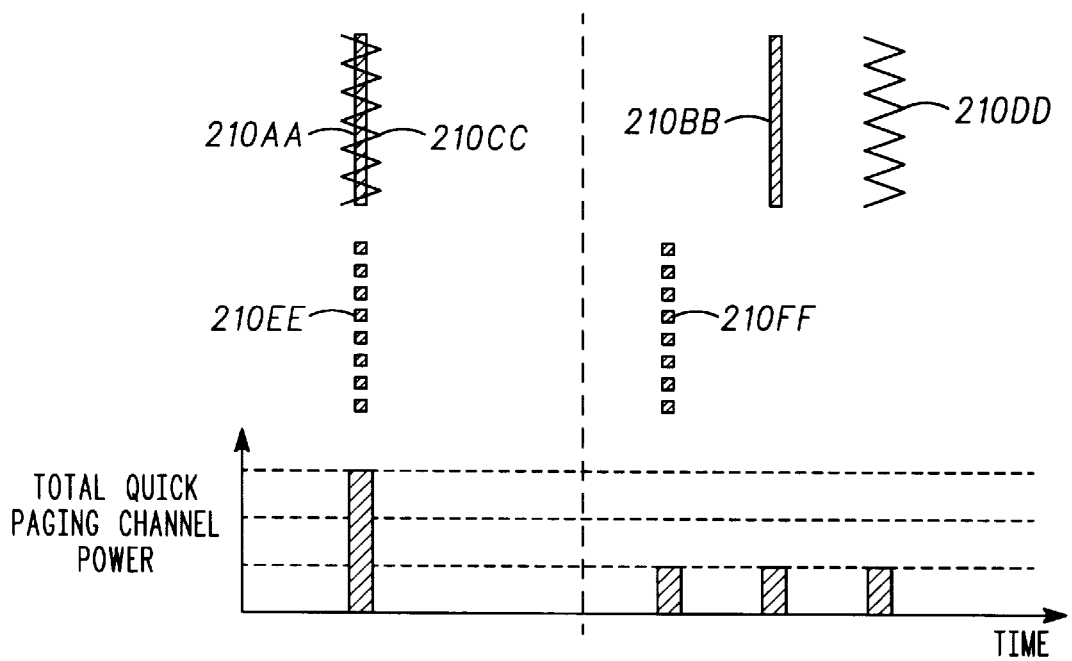
FIGS. 12A and 12B are graphs of the total power transmitted by a base station when different combinations of paging indicators are enabled on multiple quick paging channels.
Figure 12B:
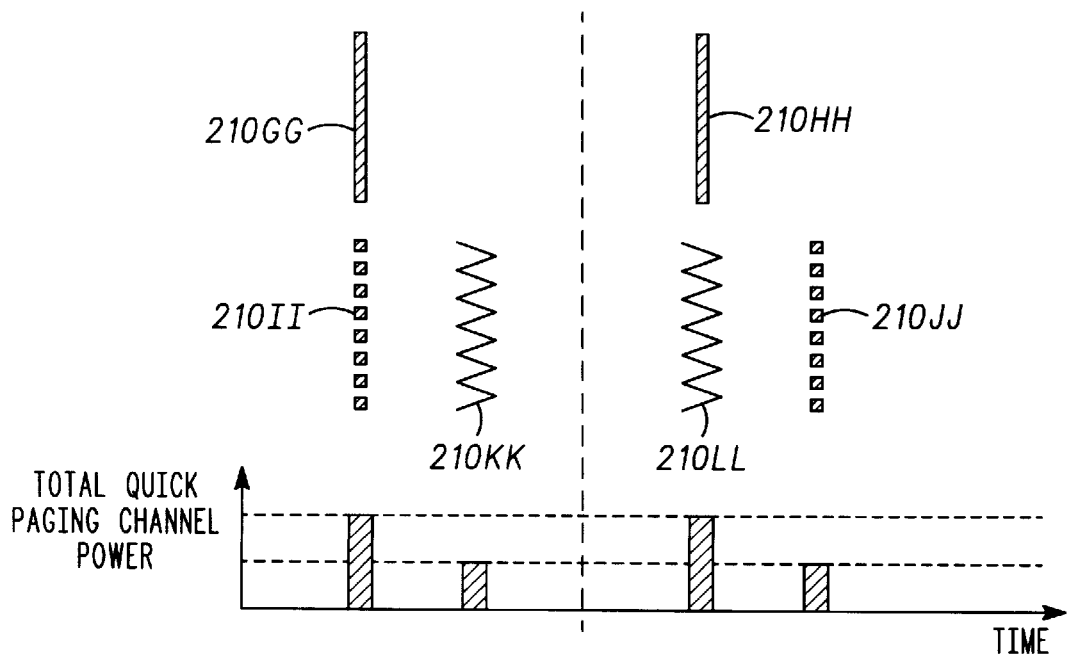

FIGS. 12A and 12B illustrate two other methods which can be used to determine which message to reschedule or cancel. FIG. 12A illustrates a method for rescheduling or canceling messages where the method used to select the message is based upon the number of messages scheduled for transmission to mobile stations that hash to the same paging indicator of a quick paging channel. Paging indicators 210AA and 210BB both correspond to a first message; paging indicators 210CC and 210DD both correspond to a second message; and paging indicators 210EE and 210FF both correspond to a third message. For purposes of discussion, the upper limit for collisions is one. In this case, the collision may be avoided by rescheduling the third message or by rescheduling both the first and second messages. Preferably, the third message is selected for rescheduling because it delays only one message. The alternative delays two messages.

FIG. 12B illustrates a method for rescheduling or canceling messages where the method used to select the message is based upon the number of collisions in which each message is involved. Paging indicators 210GG and 210HH both correspond to a first message; paging indicators 210II and 210JJ both correspond to a second message; and paging indicators 210KK and 210LL both correspond to a third message. In this case, the upper limit for collisions is one. The second message, associated with paging indicators 210II and 210JJ, is involved in a single collision. The third message, associated with paging indicators 210KK and 210LL, is also involved in a single collision. However, the first message, associated with paging indicators 210GG and 210HH, is involved in a two collisions. Both collisions may be avoided by rescheduling the first message or by rescheduling both the second and third messages. Preferably, the first message is rescheduled because two collisions are resolved and only one message is delayed in this way. The alternative is to reschedule the second and third messages, delaying both of them.

It will be apparent that other and further forms of the invention may be devised without departing from the spirit and scope of the appended claims and their equivalents, and it will be understood that this invention is not to be limited in any manner to the specific embodiments described above, but will only be governed by the following claims and their equivalents.

What is claimed is:

1. In a wireless communication system, a method comprising the steps of:

determining a plurality of paging indicators for transmission, wherein the plurality of paging indicators is associated with a plurality of messages scheduled for transmission;

determining if there is a transmission time collision between any of the plurality of paging indicators;

selecting at least one of the messages associated with at least one of the paging indicators involved in the transmission time collision to produce an at least one selected message; and rescheduling transmission of the at least one selected message for a subsequent transmission.

2. The method of claim 1, wherein the at least one selected message is selected based upon an amount of time the at least one selected message has been queued.

3. The method of claim 1, wherein the at least one selected message is selected based upon an amount of time until a scheduled paging channel time slot associated with the at least one selected message.

4. The method of claim 1, wherein the at least one selected message is selected based upon an extent of a number of collisions determined for each paging indicator.

5. The method of claim 1, wherein the at least one selected message is selected based upon a hashing function leading to a same paging indicator.

6. The method of claim 1, further comprising the steps of canceling transmission of at least one of the number of messages associated with at least one of the number of paging indicators determined in the transmission time collision.

7. The method of claim 6, wherein the canceling of the least one of the number of paging messages is based upon whether at least one other transmission time of the least one of the number of paging messages is scheduled.

8. In a wireless communication system having at least one paging channel and a plurality of quick paging channels, a method of scheduling a message queued for transmission to a mobile station in a paging channel time slot associated with a quick paging channel time slot, comprising the steps of:

determining paging indicators in the quick paging channel time slot;

determining if there is a time collision between paging indicators set on different quick paging channels; and selecting a message associated with one of the paging indicators involved in the time collision; and rescheduling the selected message for transmission in a subsequent paging channel time slot.

9. The method of claim 8 wherein the message is selected based upon an amount of time the message has been queued.

10. The method of claim 8 wherein the message is selected based upon an amount of time until a next scheduled paging channel time slot assigned to the mobile station.

11. The method of claim 8 wherein the message is selected based upon a number of collisions in which each message is involved.

12. The method of claim 8 wherein the message is selected based upon a number of messages scheduled for mobile stations that hash to a same paging indicator of any quick paging channel.

13. The method of claim 8, further comprising the step of determining whether a number of paging indicators involved in the time collision is greater than an established upper limit.

14. The method of claim 13, further comprising the steps of:

selecting a message associated with one of the paging indicators involved in the time collision; and rescheduling the selected message for transmission in a subsequent paging channel time slot.

15. The method of claim 8, further comprising the steps of:

selecting a message associated with one of the paging indicators involved in the time collision; and canceling the selected message.

16. The method of claim 15, wherein the message is selected based upon whether at least one other transmission of the message is scheduled to be sent.

17. In a wireless communication system having at least one paging channel and a plurality of quick paging channels, a method of scheduling a message queued for transmission to a mobile station in a paging channel time slot associated with a quick paging channel time slot, comprising the steps of:

determining paging indicators in a quick paging channel time slot;

determining if there is a time collision between paging indicators set on different quick paging channels;

determining whether the number of paging indicators involved in the time collision is greater than an established upper limit;

selecting a message associated with one of the paging indicators involved in the time collision; and rescheduling the selected message for transmission in a subsequent paging channel time slot.

18. The method of claim 17 wherein the message is selected based upon an amount of time the message has been queued.

19. The method of claim 17 wherein the message is selected based upon an amount of time until a next scheduled paging channel time slot of the mobile station.

20. The method of claim 17 wherein the message is selected based upon a number of collisions in which each message is involved.

21. The method of claim 17 wherein the message is selected based upon a number of messages scheduled for transmission to mobile stations that hash to a same paging indicator of any quick paging channel.

22. A system for scheduling a message queued for transmission, comprising:

a base station and at least one mobile station in communication to define:

at least one paging channel;

a plurality of paging channel time slots within the paging channel;

a plurality of quick paging channels; and a plurality of paging indicators within the quick paging channels; and a paging channel controller programmed to determine whether there is a time collision between paging indicators set on different quick paging channels, select a message associated with one of the paging indicators involved in the time collision, and reschedule the selected message for transmission in a subsequent paging channel time slot.

23. The system of claim 22, wherein the paging channel controller is programmed to select the message based upon the amount of time the message has been queued.

24. The system of claim 22, wherein the paging channel controller is programmed to select the message based upon an amount of time until a next scheduled paging channel time slot of the mobile station.

25. The system of claim 22, wherein the paging channel controller is programmed to select the message based upon a number of collisions in which each message is involved.

26. The system of claim 22, wherein the paging channel controller is programmed to select the message based upon a number of messages scheduled for transmission to mobile stations that hash to a same paging indicator of any quick paging channel.

27. A system for scheduling a message queued for transmission, comprising:

a base station and at least one mobile station in communication to define:

at least one paging channel;

a plurality of paging channel time slots within the paging channel;

a plurality of quick paging channels; and a plurality of paging indicators within the quick paging channels; and a paging channel controller programmed to determine whether there is a time collision between paging indicators that would be set on different quick paging channels, select a message associated with one of the paging indicators involved in the time collision, and cancel the selected message.

28. A system for scheduling a message queued for transmission, comprising:
  means for communicating to define:
    at least one paging channel;
    a plurality of paging channel time slots within the paging channel;
    a plurality of quick paging channels; and
    a plurality of paging indicators within the quick paging channels;
  means for determining whether there is a time collision between paging indicators set on different quick paging channels;
  means for selecting a message associated with one of the paging indicators involved in the time collision; and
  means for rescheduling the selected message for transmission in a subsequent paging channel time slot.

29. The system of claim 28, wherein the means for selecting a message is configured to select the message based upon an amount of time the message has been queued.

30. The system of claim 28, wherein the means for selecting a message is configured to select the message based upon an amount of time until a next scheduled paging channel time slot of the mobile station.

31. The system of claim 28, wherein the means for selecting a message is configured to select the message based upon a number of collisions in which each message is involved.

32. The system of claim 28, wherein the means for selecting a message is configured to select the message based upon a number of messages scheduled for transmission to mobile stations that hash to a same paging indicator of any quick paging channel.

33. A system for scheduling a message queued for transmission, comprising:
  means for communicating to define:
    at least one paging channel;
    a plurality of paging channel time slots within the paging channel;
    a plurality of quick paging channels; and
    a plurality of paging indicators within the quick paging channels;
  means for determining whether there is a time collision between paging indicators set on different quick paging channels;
  means for selecting a message associated with one of the paging indicators involved in the time collision; and
  means for canceling the selected message.

* * * * *